United States Patent
Sachdev et al.

(10) Patent No.: US 10,353,978 B2
(45) Date of Patent: Jul. 16, 2019

(54) URL NORMALIZATION

(71) Applicant: Facebook, Inc., Menlo Park, CA (US)

(72) Inventors: Gurpreetsingh Baljeetsingh Sachdev, Fremont, CA (US); Shashikant Khandelwal, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 332 days.

(21) Appl. No.: 15/203,594

(22) Filed: Jul. 6, 2016

(65) Prior Publication Data

US 2018/0013720 A1   Jan. 11, 2018

(51) Int. Cl.
*G06F 16/955* (2019.01)
*G06F 16/95* (2019.01)
*G06Q 30/00* (2012.01)

(52) U.S. Cl.
CPC ............ *G06F 16/955* (2019.01); *G06F 16/95* (2019.01); *G06Q 30/00* (2013.01)

(58) Field of Classification Search
CPC ............ H04L 61/2076; H04L 61/2046; H04L 61/6004
See application file for complete search history.

(56) References Cited

U.S. PATENT DOCUMENTS

| | | | | |
|---|---|---|---|---|
| 8,042,112 B1* | 10/2011 | Zhu | ................... | G06F 17/30864 718/102 |
| 8,984,640 B1* | 3/2015 | Emigh | ................ | H04L 63/1441 726/25 |
| 9,418,114 B1* | 8/2016 | Mengle | ............. | G06F 17/30522 |
| 9,692,702 B1* | 6/2017 | Brown | ..................... | H04L 47/12 |
| 2004/0172389 A1* | 9/2004 | Galai | ................ | G06F 17/30864 |
| 2004/0177015 A1* | 9/2004 | Galai | ................ | G06F 17/30864 705/35 |
| 2007/0101315 A1* | 5/2007 | Dahyabhai | .......... | G06F 9/44526 717/120 |
| 2008/0010292 A1* | 1/2008 | Poola | ................... | G06F 17/2211 |
| 2008/0109832 A1* | 5/2008 | Ozzie | ..................... | G06F 9/543 719/329 |
| 2008/0172400 A1* | 7/2008 | Koronthaly | ....... | G06F 17/30914 |
| 2009/0164502 A1* | 6/2009 | Dasgupta | .......... | G06F 17/30887 |
| 2011/0119268 A1* | 5/2011 | Rajaram | ........... | G06F 17/30887 707/737 |
| 2013/0275384 A1* | 10/2013 | Sivasubramanian | ........................ | G06Q 10/107 707/664 |
| 2014/0214790 A1* | 7/2014 | Vaish | ................ | G06F 17/30011 707/709 |
| 2015/0007006 A1* | 1/2015 | Kaminsky | ........... | G06F 17/3089 715/205 |

(Continued)

*Primary Examiner* — Alina A Boutah
(74) *Attorney, Agent, or Firm* — Baker Botts L.L.P.

(57) ABSTRACT

In one embodiment, a method includes receiving a plurality of uniform resource identifiers (URI's) associated with a particular domain. Each of the URI's identifies a content page comprising one or more signature elements. The method further includes, for each URI in the plurality of URI's, successively testing the URI to identify a core of the URI and any unnecessary elements of the URI. The core of the URI is sufficient to retrieve a version of the content page including all of its signature elements. The method additionally includes, for each URI in the plurality of URI's, updating a set of rules based on the identified core and the identified unnecessary elements. The set of rules establishes a normalized version of the URI.

20 Claims, 9 Drawing Sheets

(56) References Cited

U.S. PATENT DOCUMENTS

| | | | |
|---|---|---|---|
| 2015/0058422 A1* | 2/2015 | Malygin | H04L 67/1025 |
| | | | 709/204 |
| 2015/0156560 A1* | 6/2015 | Choi | H04H 60/73 |
| | | | 725/116 |
| 2015/0237068 A1* | 8/2015 | Sandke | H04L 63/1466 |
| | | | 726/23 |
| 2017/0257456 A1* | 9/2017 | Vaish | H04L 67/32 |
| 2017/0329461 A1* | 11/2017 | Schikora | G06F 17/30292 |
| 2017/0330151 A1* | 11/2017 | Schikora | G06F 17/30569 |
| 2018/0174104 A1* | 6/2018 | Schikora | G06Q 10/103 |

* cited by examiner

*FIG. 7A*

702 → http://shop.bigcompany.com/c/mens-performance-jackets?
origin=leftnav#category=b60137679&type=category&defaultsize3=&size=&
width=&color=&price=&brand=&stores=&instoreavailability=false&lastfilter
=&segmentId=0&page=2&sizeFinderId=4&resultsmode=

704 → c | mens-performance-jackets | origin=leftnav | category=b60137679 |
type=category | defaultsize3= | size= | width= | color= | price= | brand= | stores= |
instoreavailability=false | lastfilter= | segmentId=0 | page=2 | sizeFinderId=4 |
resultsmode=

706 → http://shop.bigcompany.com/c/mens-performance-
jackets?origin=leftnav#category=b60137679&type=category&defaultsize3=&
size=&width=&color=&price=&brand=&stores=&instoreavailability=false&la
stfilter=&segmentId=0&page=2 http://shop.bigcompany.com/c/mens-performance-jackets?origin=leftnav#category=b60137679&type=category&defaultsize3=&size=&width=&color=&price=&brand=&stores=&instoreavailability=false

*FIG. 7D* http://shop.bigcompany.com/c/mens-performance-jackets?origin=leftnav#category=b60137679&type=category

*FIG. 7E*

URL NORMALIZATION

TECHNICAL FIELD

This disclosure generally relates to normalizing uniform resource locators.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In certain embodiments, a plurality of uniform resource identifiers (URI's) are received. URI's can identify physical resource endpoints for retrieving content from a web server. For example, the URI's may include uniform resource locators (URL's). In certain embodiments, the URI's are each associated with a particular domain. For example, the domain can be associated with a website of an electronic commerce (e-commerce) retailer. In certain embodiments, each URI identifies a content page hosted by a web server that is configured to host content for an organization associated with the particular domain. In certain embodiments, each URI is successively tested to identify a "core" of the URI. The core of the URI can refer to a version of the URI that is sufficient to retrieve a version of the content page that includes all of its signature elements. For example, signature elements can refer to page elements, such as document object model (DOM) nodes, controls, containers, or other objects from a content page. In certain embodiments, a set of rules is updated based on the identified core. For example, the set of rules can include rules regarding common URI elements, paths, field-value pairs, parameters, or the like and their relationships to any identified URI cores.

In certain embodiments, URI's are collected by a web crawler or URI seeding process and sent to a URI normalization process for extraction of core URI strings and identification of necessary and unnecessary elements. Core URI strings and elements can be determined based on their propensity for causing a resource to return signature page elements. For example, in the context of an item identification and item information extraction system, an item listing recognizer identifies website listing items (e.g., product listings, travel tickets, event tickets, auction items, dining or other reservations, or any other items made available through a listing in a website interface) on crawled web pages. URI's corresponding to identified pages are sent to the URI normalization process for processing. URI components that cause the specified resources at the domain to return the item listings are identified. In certain embodiments, the item listings are referred to as signature elements. Core URI strings and elements are augmented to determine portions of the supplied URI's that control retrieval of signature elements. In certain embodiments, the URI normalization process establishes rules for iterating through item listings associated with a particular web domain. These rules can be used by information extraction processes to optimize domain crawling algorithms for a particular purpose. In one example, the crawling algorithms can be optimized to extract item listing information in an efficient manner.

In certain embodiments, URI components include, for example, domains, subdomains, paths, parameters, query strings, port specification strings, protocol specification strings, and the like. In certain embodiments, elements may refer to portions of components, or components themselves. For example, a query string includes a list of parameters that each represent a URI element. As another example, directories in the resource path are considered elements. In certain embodiments, a URI normalization process successively tests URI's by augmenting each URI to successively eliminate "unnecessary elements." Unnecessary elements may refer to elements that do not affect the content (e.g., signature elements) retrieved from the resource. In certain embodiments, augmented URI's resolve to a particular resource and content is retrieved from the resource. The retrieved content is compared against content retrieved from the original (i.e., un-augmented) URI. For example, signature elements are defined in the content retrieved from the original URI and compared against the content retrieved from the augmented URI's to determine whether the signature elements are present in the retrieved content.

In certain embodiments, signature elements correspond to item listings. For example, a "product" listing recognizer is utilized by a URL normalization process to identify signature elements, in this case "products," in content pages retrieved from an original or un-augmented URI. A product listing recognizer may be capable of extracting a document object model (DOM) for a content page, such as a web page. The DOM is a hierarchical tree-based data structure that represents each element of the content page as a "node." Nodes in the DOM are processed to determine whether they qualify as a product listing based on whether extracted information fulfills a required set of characteristics for a product listing. Other information can be used to determine whether the node qualifies as another type of "item." For example, the node may qualify as a movie ticket, dining reservation, hotel reservation, or any other item being listed. In certain embodiments, URL normalization is run on any type of page. For example, an item or product listing recognizer may only be used in the context of an "item page" or a "product page" in which only one item or product is showcased. The URL normalization processes may be used on any type of page, even those pages which do not feature any item listings or products. For example, the URL normalization processes may be run on a "category page" or a content page with multiple products being listed.

In certain embodiments, each item listing identified in an original URI is defined as a signature element. The item listing recognizer can be used to identify product listings or other items in retrieved content corresponding to augmented URI's. The URI normalization process compares the identified item listings to the original set of signature elements to determine whether a core of the URI has been reached. In certain embodiments, URI elements, such as parameters or path elements are successively removed from an original version of a URI, such as the version of the URI supplied by a web crawling process. If the URI normalization process determines that the signature elements are not present in the retrieved content for the augmented URI, the removed element may be considered part of the core of the URI. In other words, the core of the URI represents a URI that contains primarily "necessary elements," or elements that are useful for display of each signature element. Identification of core URI's from various URI strings may allow identification of a mechanism to iterate through item listings through manipulation of necessary elements. For example, a product information extraction process uses identified URI's and necessary and unnecessary elements to iterate through an organization's item listings and retrieve information regarding each listed product.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 7A-E illustrate an iterative URL normalization process to arrive at a canonical URL.

DESCRIPTION OF EXAMPLE EMBODIMENTS

Figure 1:
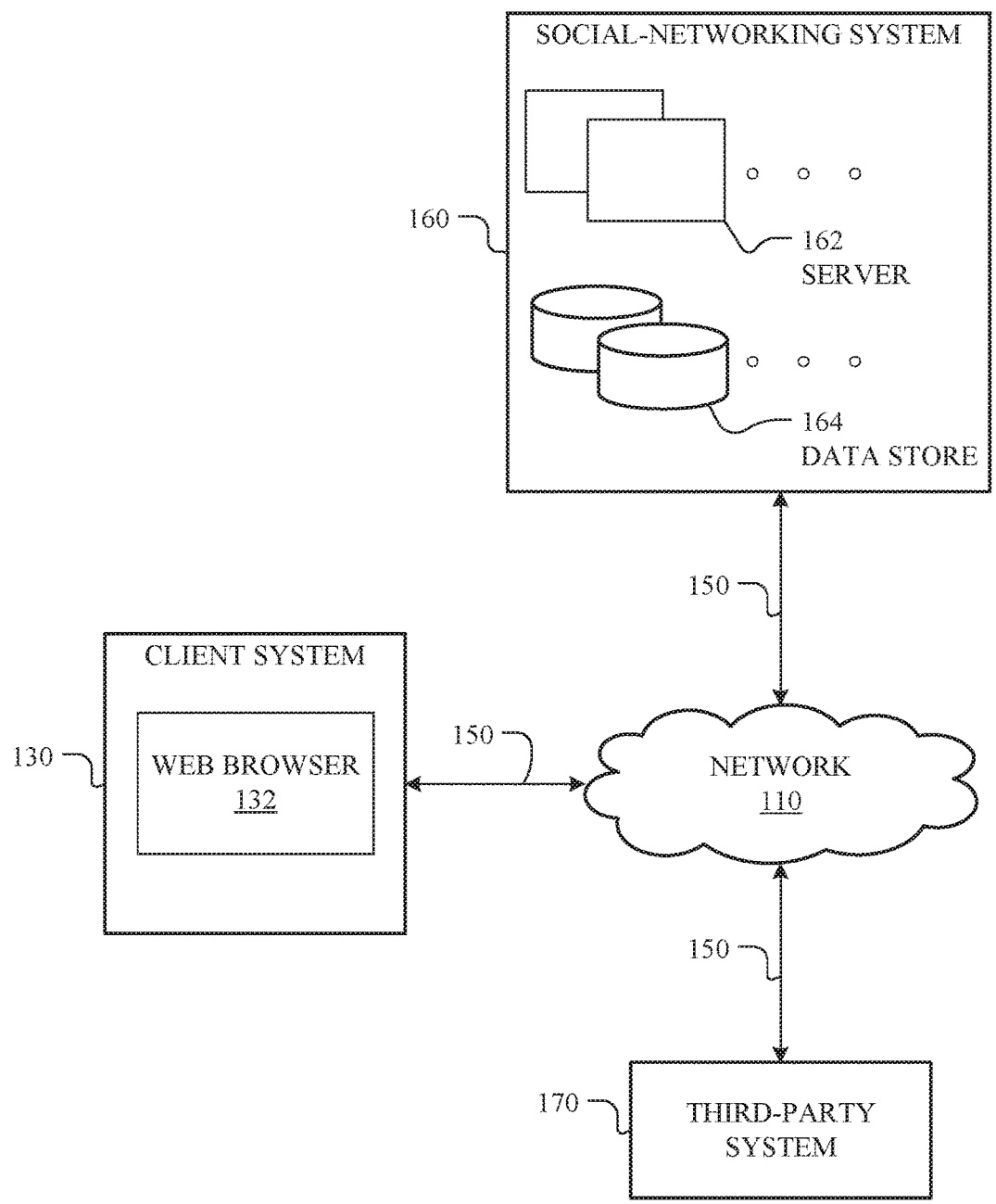
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate. More information on webpages may be found in U.S. patent application Ser. No. 11/856,202, filed 17 Sep. 2007, which is incorporated by reference.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
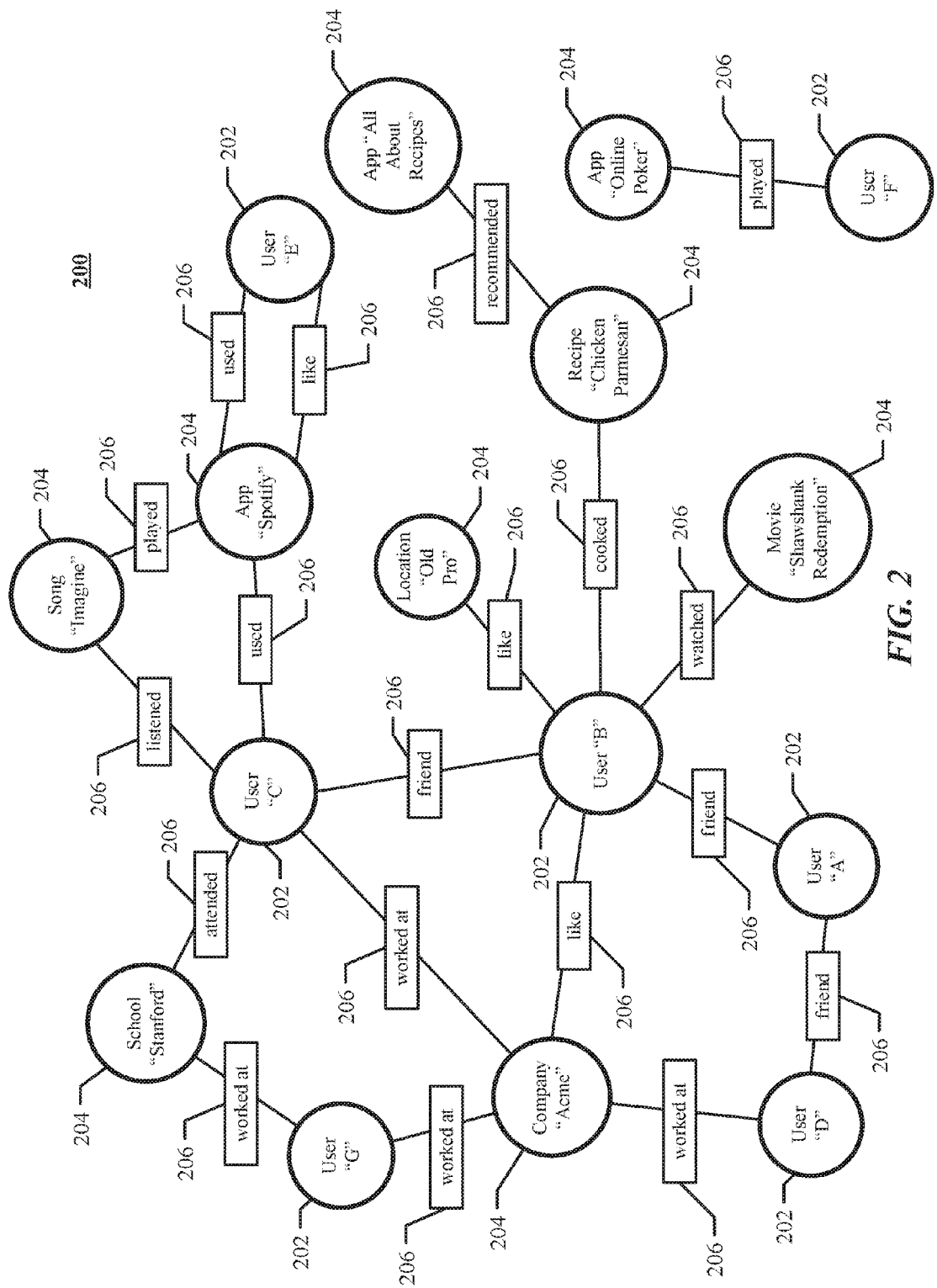
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The popularity of e-commerce websites has fueled a rapid expansion of the number of products and services offered for sale online. Low overhead costs and a wide array of available shipping options allow e-retailers to offer the same products that are sold in brick and mortar stores, often for lower prices and with a larger selection of alternative products. Traditional brick and mortar franchises often list their products for sale online too, bringing their own market advantages to bear, such as by offering same day in-store pickup or delivery or lower prices provided by supply chain advantages of high-volume retailers. Today, nearly every product sold in the developed world is available online through numerous sellers.

Usually, an item is made available for sale online via a "listing item" on a webpage. The listing item contains information regarding the item such as, for example, the seller of a product, the location of retail chains of the seller that may carry the product, a mechanism for a user to purchase the product over the internet (e.g., a "buy it now" or "add to cart" button), a mechanism to book a reservation at a restaurant or a hotel, and the like. In some cases, the same item may be listed on numerous (e.g., hundreds or thousands) of e-commerce websites via different listings that contain similar listing attributes. Often, these listings are not standardized across retailers. Some websites sell items with different available options, such as different sizes or colors, and may include purchase incentives, such as free shipping or other special features. As another example, a "suite" at a particular hotel may be offered with a king bed or two double beds. While both rooms are "suites" they each provide a different options or features. Similarly, reviews are hosted online in an item listing corresponding to a particular review or set of reviews However, this information is often difficult to aggregate between listings provided by various retailers.

While the particulars of listing item conventions vary between vendors, listing items are usually presented on content pages that share one or more identifiable or common attributes across vendors. For example, a typical e-commerce website may contain the following types of pages: item detail pages, non-item pages, multiple item listing pages (e.g., listing items by category or listing items responsive to a user search), and other generic web pages (e.g., home, about, blog articles, and the like). It may be useful to distinguish between each type of page in order to analyze the data contained therein. For example, when extracting information regarding item listings, item detail pages are useful because they present a large amount of relevant information regarding each item. As another example, item listing pages are useful for iterating through all items available on a particular webpage. The terms product listing, item listing, service listing, review listing, and any other type of identifiable listing are referenced interchangeably in the context of the present disclosure. For example, those of ordinary skill in the art will appreciate that the term product listing can refer to hotels, restaurant reservations, or other experiences. Similarly the same terminology may refer to review listings without departing from the scope of the present disclosure.

Item listings are often presented on certain types of content pages that share one or more identifiable or common attributes. For example, a typical e-commerce web site may contain the following types of pages: product detail pages, non-product pages, multiple product listing pages (e.g., listing products by category or listing products responsive to a user search), and other generic web pages (e.g., home, about, blog articles, and the like). It may be useful to distinguish between each type of page in order to analyze the data contained therein. For example, when extracting information regarding product listings, product detail pages are useful because they present a large amount of relevant information regarding each product. As another example, product listing pages are useful for iterating through all products available on a particular webpage.

However, pages of an e-commerce website are often difficult to classify or identify since considerable processing of content pages is required to extract enough useful information to make a determination as to the type of page presented. For example, product detail pages are often unstructured and non-uniform between websites. Different websites may nest product listings within varying layers of nested HTML, elements, such as multiple layers of "div" elements used in positioning product content and rendering other visual content items. As another example, a structured document, such as an XML document, that includes product listing information is provided to a mobile device application (e.g., a mobile app) for display. However, various retailers provide cataloged product information in different formats (e.g., via XML but using a different schema, syntax, or the like). Various other heterogeneous configurations for providing product listing information can be imagined. Accordingly, algorithms designed to extract product information from such listings should be adaptable to extract relevant information from any of a number of product listing formats. These algorithms may also be used to extract details regarding each product for clustering and normalization so that the extracted information can be used to improve user experience. For example, organizations often desire to use product information from different e-commerce sellers to benefit their customers. Sometimes a company providing a free service to a user, such as a social-networking service, may attempt to advertise particular products that correspond to identified interests of their users in order to continue providing that service free of charge. In some cases, this information can even be used to improve the provided service or to provide additional services to meet or surpass user expectations. The organization may receive resources from the e-commerce site in exchange for displaying an advertisement or contributing to a sale of the advertised item. This symbiotic relationship may allow the organization to pay for other resources, such as servers and employees, without charging its users. However, once product information has been extracted, an accurate and reliable mechanism for organizing that product information is required in order to productively use it.

In certain embodiments, a product listing aggregation service "crawls" content pages associated with e-commerce retailers to extract product information. "Crawling" may refer to iteration over and discovery of content pages. For example, a web crawler may crawl web sites associated with a specific keyword. As another example, a crawler crawls a list of web domains. The crawler loads content associated with each identified page. In certain embodiments, content pages are classified based on identified attributes of features within the content page. The classifications can be used to formulate an algorithm tailored to crawling the particular site. For example, the algorithm may provide a smarter or more efficient means to iterate through each product listing. This is in contrast to other methods of iteration such as, for example, brute force crawling. Proper identification of product listing pages and product detail pages, as well as other types of pages, is critical to tailoring a crawling algorithm to a particular purpose, such as optimized product information extraction and cataloging.

In certain embodiments, e-commerce retailers are identified and content pages are crawled or processed to extract product listing information. For example, Big Co., a fictional department store chain having numerous franchises (e.g., brick and mortar stores) throughout the country, lists products online through its website www.bigcompany.com in addition to selling products in its retail stores. Big Co. lists products from various vendors in different departments or sections within its stores and on its website. The website contains a considerable amount of information regarding each listed products. In certain embodiments, a product catalog, such as a catalog available by subscription (e.g., the CNET product catalog), is analyzed for product listings. Product catalogs and other formats for conveying product information can be analyzed as content pages in accordance with the teachings of the present disclosure.

Often, the following product information is associated with each product listing: title, product reference number, manufacturer, color, size, model, product image(s), alternative product views, availability (e.g., units available in Big Co.'s warehouse and/or at its franchise locations), price, description, special offers, product features, noun, manufacturer's product number (MPN), universal product code (UPC), dimensions, and the like. A robust view of available product information is illustrated with reference to product panel 410 in product page 400 of FIG. 4. Big Co. may also release a product catalog in a human readable, machine readable, or any other format. For example, Big. Co. distributes a structured document that lists each of its products, available options, and list price. The catalog contains some and/or all of the product listing information available on Big. Co.'s website for each listed product.

In certain embodiments, an e-commerce company's website structure is analyzed to optimize product listing information retrieval operations. Website structure includes the layout of the site, organization of pages, architecture of the site, and the like. For example, Big Co.'s website layout can be analyzed by a classification process and a site map can be generated. A site map provides a hierarchical mapping of content pages to other related pages, and is useful for navigating through or iterating through pages of related content, such as product listing pages. In certain embodiments, a crawling process constructs a site map for a given set of web pages based on determined page types. While analyzing the structure of a given website, features of each content page are analyzed to identify elements, and the page is categorized as a particular "type" of page (e.g., product listing page, product detail page, home page, about page, and the like). For example, if a number of product listings are identified on a page, the page is classified as a product listing page.

In certain embodiments, a crawling process converts particular pages identified during a crawl into a hierarchical tree-based data structure that contains information regarding content elements associated with the page. The content elements are analyzed to identify product listings, reviews, and other identifiable features of each page. A context of identified features is determined and used to categorize pages. For example, www.bigcompany.com is structured so that product listings are accessible in multiple views on a particular page. The context of the page may relate to how products are listed within the page. The context of the page may include other attributes including size and positioning of the products, other identified features on the page, incoming and outgoing links, relational aspects of user interface items on the page, and various other page-related characteristics. A home page of bigcompany.com lists several featured items in a featured products content panel. The configuration of the content panels on the home page contributes to the context of the page and/or the context of identified features on the page. The context can be used to determine any interrelation between page features and features on the current page and/or features on additional (e.g., linked) pages. For example, clicking a featured item displayed in a home page content panel loads a new related page that lists products that are related to the home screen content. Additional pages of the bigcompany.com website showcases product listings using other content panels that are optimized for displaying large numbers of related products for comparison purposes. While the features or controls of the home page may be designed to show a random sampling of representative goods (with a goal of drawing in new users by showing available products that new users may be interested in), the page features or controls of product listing pages may be more conducive to product iteration and information extraction.

In certain embodiments, each page is analyzed to extract features that, when considered together and/or in isolation, may suggest whether the page is a product page. Product listings on the home page may be optimized to attract new users or facilitate existing user access to products, such as by enlarging a product picture and/or adding graphics, this format of listing products is not conducive to complete information extraction. In contrast, a product details page lists a comprehensive view of the product (i.e., a complete listing of product information). The comprehensive view of the product may be preferable for information extraction operations.

These differences in pages (e.g., differences between a home page and a product page) can be extracted from a DOM as features, attributes, and context information. For example, the functionality of product listing pages is designed for iteration over a set of products. Product listings and navigation buttons on each page are extracted as features. Attributes such as size and positioning of the features are extracted. Context information such as relationship and functionality of features is also extracted. Features associated with this iteration are identified as features and information regarding the context of the features is extracted to determine a classification for the page. Thus, while both "home" pages and "product listing" pages may contain product listings, categorization of each page type is possible using feature extraction and context analysis. Such an analysis allows information extraction process to optimally extract product information by targeting specific types of pages for iteration.

Page classification is useful for optimizing information extraction. For example, while blogs associated with an affiliated product line are useful for attracting new buyers, product information extraction algorithms may be better suited for examining other types of pages for product listing content, such as product listing pages and/or product details pages that are designed for product iteration and information display. The product page classifier may categorize a blog or article page as a non-product listing page (using any useful naming convention). Other pages that are better suited for information extraction operations can be inspected and classified as product pages. In certain embodiments, clues from product page features and page context can be used to identify additional product pages and may be used to classify content pages. In certain embodiments, webpage uniform resource locators (URL's) or identifiers (URI's) can be modified directly to retrieve additional relevant product or non-product pages.

Figure 4:
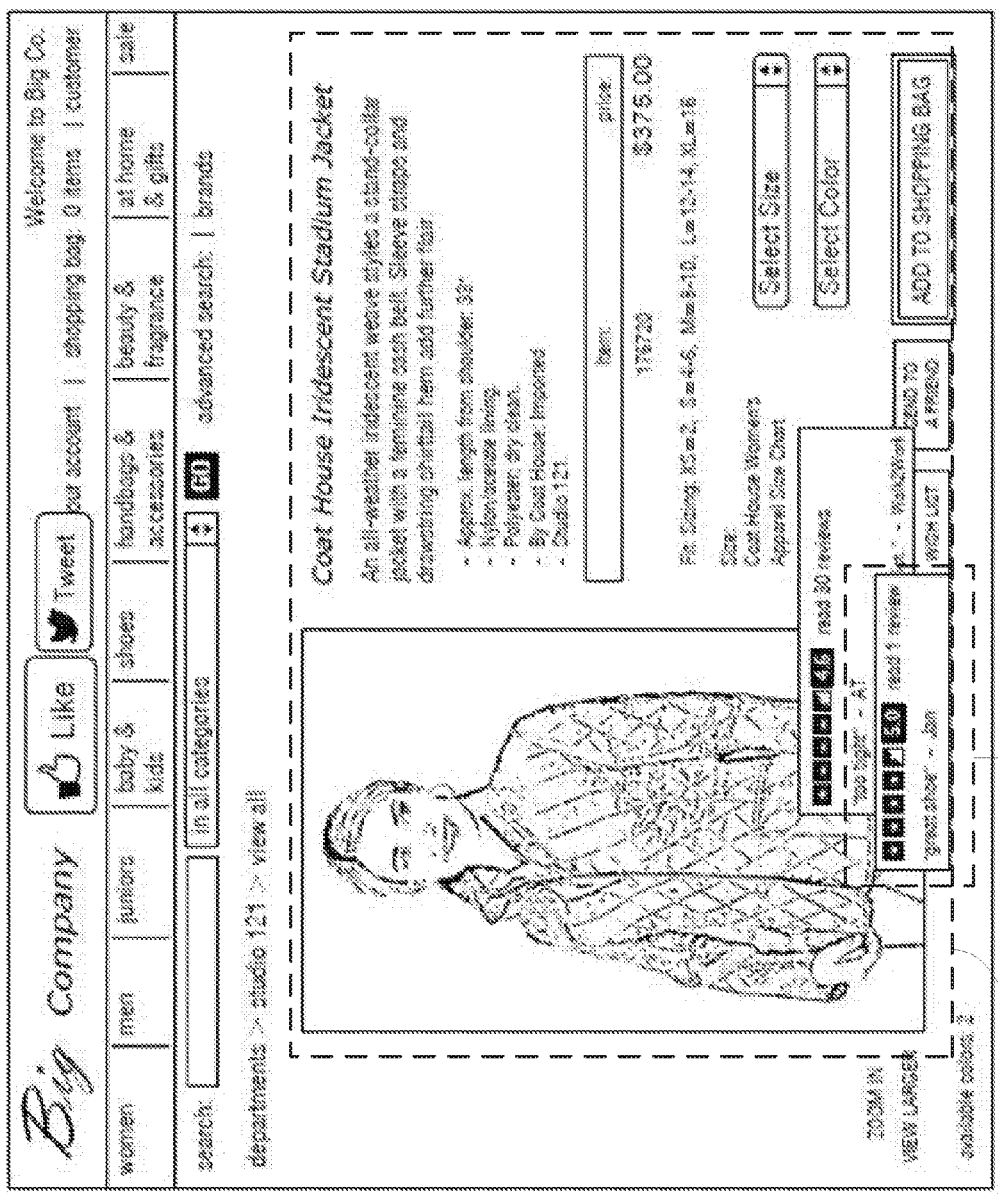
FIG. 4 illustrates an example product details page.

With reference to FIG. 4, an example product details content page is illustrated in accordance with a non-limiting embodiment of the present disclosure. Content panel 410 includes a product feature 412 and a superimposed review feature 414. A product page classification process extracts page elements into nodes of a DOM. The DOM is analyzed to identify candidate features. For example, product feature 412 and review feature 414 are identified as candidate features. A feature is a recognizable collection of DOM nodes or user interface elements and their attributes, characteristics, and functionality, that collectively represent some portion of a content page. The recognition of these candidate features on page 400 along with context information collected from the features and other page elements provide strong evidence that page 400 is a product page. Upon further inspection, the positioning and size of product feature 412 further indicates that page 400 is a product details page. For example, product feature 412 is prominently positioned in the center of page 400 with product review information (e.g., review feature 414) below it. Such positioning, size, and relationship information is sometimes referred to as context information. However, context information may refer to information collected from other page elements, URL's, links, controls, and the like. Thus, using context information collected with reference to features 412 and 414, page 400 can be classified as a product details page.

As another example, the crawling algorithm retrieves another content page associated with Big Co. This page contains information regarding various product listings. For example, with reference to FIG. 5, an example web page 500 associated with Big Co. is illustrated in accordance with a non-limiting embodiment of the present disclosure. Web page 500 displays a content panel 510 containing a row of product listing features 512A-D and navigation panel 520. Each product feature 512A-D is represented by an image, a model name, a manufacturer, brief description, price, and color options. In this example, each product listing provides a high level overview of a men's jacket product. In certain embodiments, a web crawling process receives, for example, html instructions for building this webpage. A DOM is constructed to analyze page elements. In certain embodiments, the crawling process is provided with a more generalized URL that is manipulated to retrieve the listing of men's jackets shown in FIG. 5.

Figure 5:
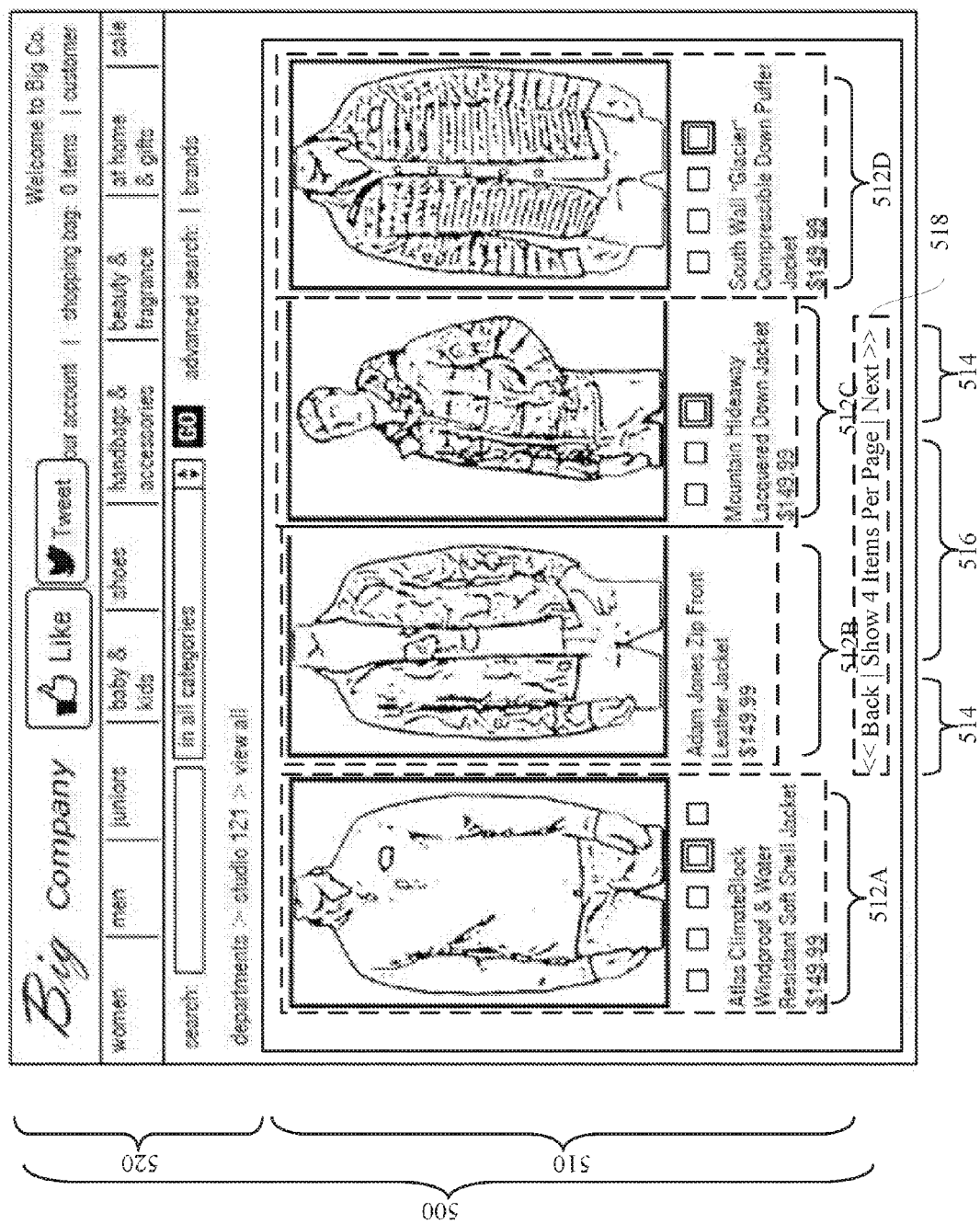
FIG. 5 illustrates an example content page featuring product listings.

With reference to content panel 510 shown in FIG. 5, four product features 512A-D are listed in a first row. In certain embodiments, page 500 includes additional rows of product listings. The additional listings may be related to the other product listings. Page 500 also includes navigation button links 514 (i.e., "Back" and/or "Next" buttons or links), and a combo box 516 for selecting the number of items listed on each page. Collectively, this group of controls or user interface elements can be referred to as navigation feature 518. Presently, only 4 products are listed on each page; however, combo box 516 may have interactive functionality that allows an end user to select the desired number of product listings to display per page. By way of explanation, client devices connected via low bandwidth connections may load pages with less content faster than pages with large amounts of content. On certain pages, a left side column contains product attributes used for filtering product listings. With reference to webpage 500, a breadcrumb trail in navigation panel 520 shows product attribute tags leading to the current listing of products. Certain web pages may have a product attribute filtering section that allows users to select particular product attributes for narrowing and/or expanding the list of displayed products.

In certain embodiments, a web domain is analyzed to determine seed URI's. For example, a web crawler or URI seeding process identifies signature elements in content pages retrieved from a particular domain. URI's corresponding to the identified content pages are provided to a URI normalization process. The URI normalization process determines key portions or components of the URI's that tend to control presentation of signature elements on each content page. "Signature elements" may refer to page elements, such as DOM nodes, controls, containers, or any other object or collection of objects from a content page. For example, signature elements content page 500 illustrated in FIG. 5 include product listings 512A-D. However, signature elements may refer to any other aspect of content page 500 or, more generally, any aspect of any content page. In certain embodiments, a URI normalization process determines key (e.g., necessary and/or unnecessary) elements of the URI that control retrieval or display of signature elements, such as product listings 512A-D.

With reference to FIGS. 7A-C, several example segments of a URL are illustrated in accordance with a non-limiting embodiment of the present disclosure. FIG. 7A depicts a URL 702 that resolves to a resource that returns a list of men's jackets. For example, URL 702 includes subdomain 710, domain 720, path 730, and parameter list or query string 740. A resource located at path 730 of a web server that domain 720 and subdomain 710 resolve to (e.g., via a domain name server (DNS)) returns a content page. Parameter list 740 is passed to the resource in, for example, a hyper-text transfer protocol (HTTP) GET request header. For example, URL 702 resolves to a resource that returns content page 500 of FIG. 5.

In certain embodiments, the specified resource processes parameters 740 and returns a content page. For example, the content page may be structured as an HTML document with embedded references to hosted resources, such as JavaScript files, images, or video resources. With reference to FIG. 7B, element list 704 from URL 702 is illustrated in accordance with a non-limiting embodiment of the present disclosure. For example, parameters 750, 760, and 770 are delimited in URL 702 by ampersands ("&"). The URL normalization process parses URL 702 to extract elements. In certain embodiments, URL components, as described above, and other portions of URL 702 can be extracted as elements. As an example, each parameter in parameter list 740 specifies a display configuration of returned content page 500. Element 750, for example, specifies that the products listed are from page 2 of a multi-page list of products. In certain embodiments, parameters are specified in a key-value or name-value pair format. For example, elements 750, 760, and 770 include this syntax. Parameter key "page" from element 750 is set to "2," while parameter key "resultmode" from element 770 appears to not be set to any value at all. In certain embodiments, pre-processing of such elements may be performed to automatically mark these elements as non-essential elements. For example, since the "resultmode" key is not set to any value, it is unlikely that including such a parameter in the parameter set has any effect on the retrieval of signature elements. In certain embodiments, element name recognition processes are employed to flag particular elements as likely candidates for being part of a core URI string. For example, certain names, such as "page" element 750 of FIG. 7B, may be based on a semi-standard naming convention for naming elements across websites. Such elements may provide a strong indication that the referenced element is part of a core URI string. In certain embodiments, these elements can be flagged based on rules generated during previous URI normalization processes for the current domain and/or other domains. For example, the URI normalization process creates and applies rules throughout URI normalization processes for various websites. Thus, the URI normalization process may become more efficient by learning generally applicable intricacies' of website configurations (e.g., that "page" elements generally control a numbered page of a returned result set).

Figure 3:
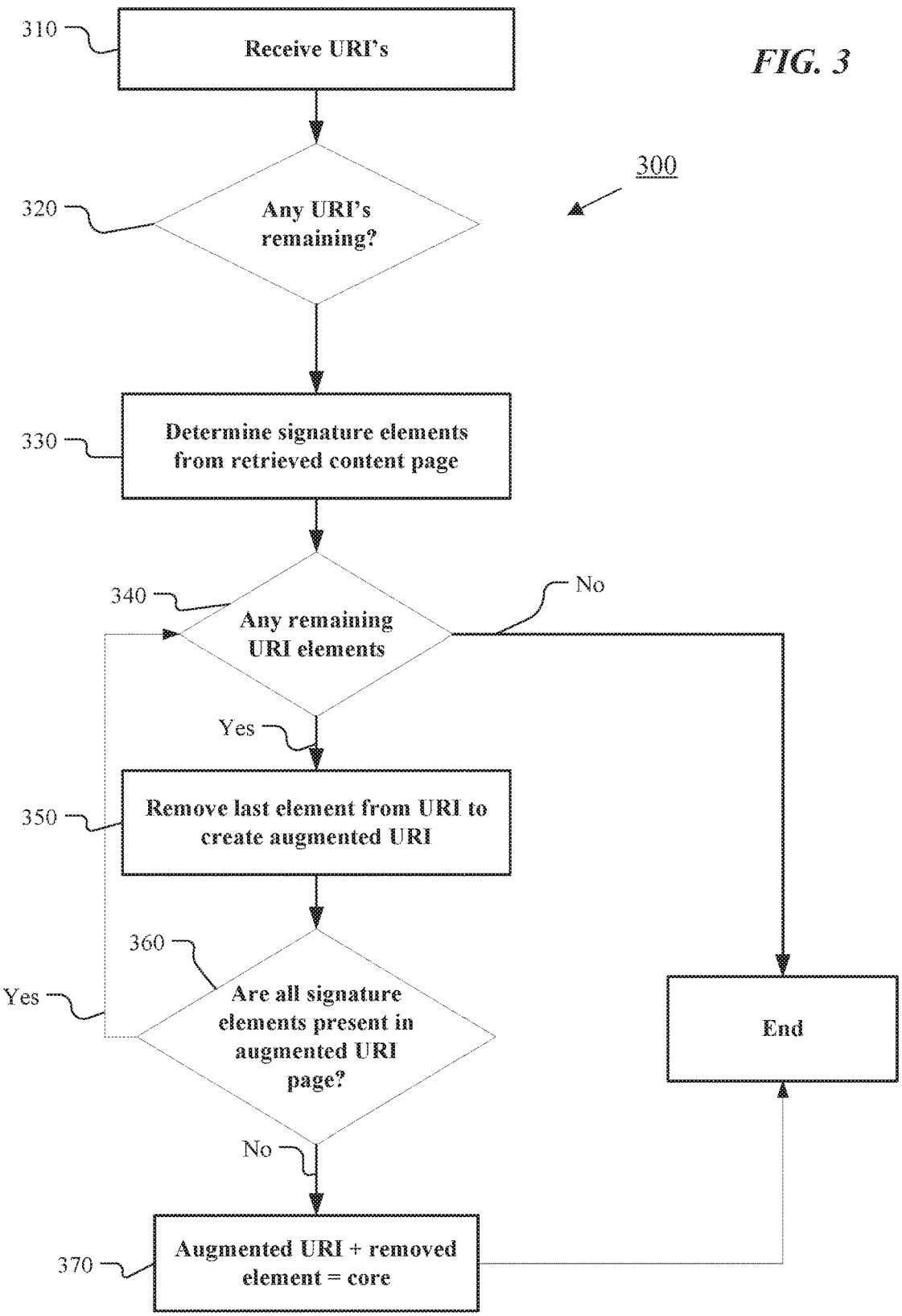
FIG. 3 illustrates an example flow chart of a method for recognizing item listings.

With reference to FIG. 3, URI normalization process 300 is illustrated in accordance with a non-limiting embodiment of the present disclosure. At step 310, URI normalization process 300 receives a list of seed URI's. For example, an administrator of a product listing aggregation service collects URL's that are associated with, for example, new e-commerce websites. Such a scenario may be useful in the case of updating an existing product listing database to include new vendor listings. In this example, the administrator monitors new e-commerce websites, and manually supplies seed URL's to URI normalization process 300 for optimization of web domain crawling routines for the website. As another example, a web crawler crawls new content pages to identify potential sources of product listings. URL's for identified pages are received by URI normalization process 300. The web crawler and URL normalization process 300 may interact, for example, through a product information extraction system.

At step 320, URI's associated with a particular domain are iterated through. For example, URI's associated with several domains can be received by URI normalization process. The URI's are filtered for an association with a particular domain. In certain embodiments, URI processing operations benefit from information extracted across URI's associated with a certain domain. For example, rules established with respect to the configuration of a particular resource of a website may be applicable to other resources of the same site. In certain embodiments, generic rules regarding identifying core URI strings can be used across domains. For example, some parameter naming conventions may become standard in the industry (e.g., "page" element 750 from FIG. 7B).

In certain embodiments, web analytics vendors provide "tracking parameters" for tracking user access from custom advertising campaigns. For example, when a user clicks on a custom link, unique parameters are sent to an analytics account, such as with GOOGLE ANALYTICS or IBM COREMETRICS, so that the administrator can identify the URL's that are the most effective in attracting users to provided content. The URL normalization process can process these URL's to determine a base, or "canonical" URL for iterating through each content page associated with a particular domain (e.g., iterating through each web page associated with a website, including item pages, item listing pages, about pages, home pages, and the like).

At step 330, a content page is retrieved for a current URI. For example, a first URI in the set is used to retrieve a content page. By way of further explanation, URI normalization process 300 may send an HTTP GET request to port 80 of the address identified by the first URI. Often, a content page or some other content will be returned by a web server at the identified address. Those of ordinary skill in the art will appreciate that no web browser may be required for transmitting such a request or receiving content in response to the request. For example, HTTP requests can be generated by URI normalization process 300 without rendering any content for a user. Moreover, the disclosure is not limited to merely GET requests, and instead includes all other types of HTTP messages including POST.

In certain embodiments, the retrieved content page includes elements that are identified during page processing. URI normalization process 300 identifies signature elements among any identified elements. In certain embodiments, signature elements are identified by generating a DOM or other structured document that represents the received content page and identifying characteristics within elements (including element and page context characteristics) that are commonly found in signature elements. For example, context information can be used to determine whether particular features, nodes, controls, or elements of the DOM conform to defined specifications for a signature element. In certain embodiments, signature elements are identified by a special process. For example, a product listing recognizer can be used to identify product listings as signature elements. Characteristics of product listings that can be used to identify signature elements include size ratios and positioning information relative to other identified product listings in the page. In certain embodiments, signature elements include page elements that are associated with product listing pages, product detail pages, or products generally. For example, signature elements may include "Back" and "Next" buttons that control the current content page displayed in a product listing interface.

At step 340, URI elements are successively tested for their effect on retrieved content. URI elements are extracted from the URI used in step 330. With reference to FIGS. 7A-B, the URI element extraction process extracts elements 750, 760, 770, as well as the other elements identified in element list 704 of FIG. 7B, from URL 702 of FIG. 7A. For example, one portion of a URI has no effect on product listings 512A-D. In other words, when the URI is augmented to remove that portion, the same product listings 512A-D are returned. Effects of particular URI components can be tested by augmenting the URI to change or remove the element. The testing process is explained further with reference to steps 350-60 below.

Specifically, step 340 determines whether any URI elements are remaining within the original URI (if this is the first pass through the flow for the URI) or the augmented URI (if this is the second or subsequent pass through the flow for the URI). For example, the URI elements identified in FIG. 7B illustrate at least some 18 URI elements available for testing from the original URI string 702 provided. If additional URI elements are available, then further testing may be conducted and the flow passes to step 350. However, if no elements remain, then testing may be complete. For example, sometimes testing can be completed on a certain URI without identifying any core URI string that controls display of signature elements. These test often indicate that the URI was not associated with a product listing page in the first place, since product listing pages will generally have some URI mechanism for manipulation of the products displayed.

With reference to step 350, a "last" URI element in the list of URI elements is removed to create an augmented URI string. For example, with reference to FIG. 7B element 770 "resultsmode" is removed from original URI string 702 to create an augmented URI string for testing. On a second pass through the flow, element 760 would be removed. In yet another example of a third pass through the flow, element 750 is removed.

In certain embodiments, URI elements can be pre-processed to remove elements that are usually not associated with controlling retrieval of signature elements. For example, parameters in the form of key-value pairs that do not specify any value (e.g., "[key name]=[blank]") are often flagged for removal, since these elements are generally not associated with controlling display of signature elements. With reference to FIG. 7B, preprocessing of the listed elements may remove at least element 770 before conducting any augmented URI tests. In this example, parameter 770 is also the last element; however, in certain embodiments, elements throughout the URI string can be removed regardless of positioning. For example, the "lastfilter=" element may be removed during a preprocessing step to expedite URI testing. Another example of removing parameters is when some globally known parameters, such as GOOGLE ANALYTICS parameters, are manually listed. In certain embodiments, these parameters can be removed from all URL's.

In certain embodiments, URI elements are removed from other portions of the URI string, such as the middle or beginning, or other components of the URI, such as the path. Moreover, sub-elements of identified URI elements can be removed or modified. For example, "value" components of the key-value pairs that are sometimes identified in URI parameters can be modified. With reference to FIG. 7B, the "value" component of the "page" element 750 can be modified from the current value "2" to, for example, "1" or "3". Such a technique may be useful in determining what aspects of signature elements or other page display features that particular elements of the core URI string control. For example, this analysis may be useful in generating rules that are passed to a product information extraction system.

At step 360, URI normalization process 300 sends an HTTP request to the address identified by the URI and receives some response. The response is processed to identify whether signature elements identified in step 330 are still present within the content page. In certain embodiments, the URI normalization process 300 determines whether some, similar, and/or different signature items are displayed in retrieved page. In certain embodiments, if the same or similar signature elements are identified in the newly retrieved page, then the process continues through another iteration of removing or augmenting a URI element and testing the augmented URI string at steps 340-360. However, if the signature elements are not identified in the response, a core string of the URI is identified in step 370. For example, if the signature elements are different once the last URI element was removed, then that URI element can be said to control some aspect of displaying the signature elements.

At step 370, a "core" or "canonical" URI or URL is identified by adding the last removed element in all signature elements are not present in the associated content page. The core or canonical URI may specify all necessary parameters for controlling display of the identified signature items. A modification or removal of the last element (e.g., parameter, path element, or the like) causes a change to the signature elements of the retrieved content page.

Figure 6:
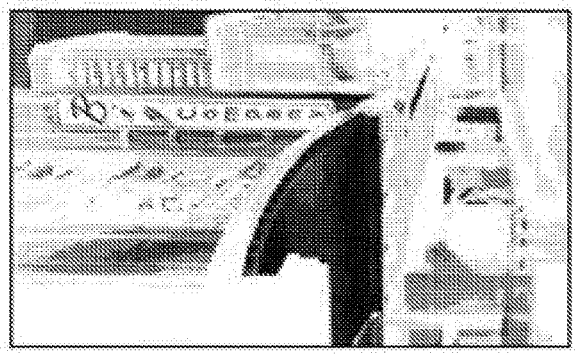
FIG. 6 illustrates an example webpage that is not associated with any item listings and is iterated through in the URL normalization process.

As a specific example using FIGS. 5 and 6, if product listings 512A-D from page 500 of FIG. 5 are identified as signature elements in a page returned using the original un-augmented URI string, and the augmented URI retrieves the content page shown in FIG. 6, which does not include any product listings or signature elements 512A-D, the core URI may be identified as including the last removed URI element. Accordingly, in certain embodiments, the last removed element (i.e., from step 350 of the last iteration through process 300) is added back to the augmented URI to produce a core URI string. In certain embodiments, the core string has some and/or all unnecessary URI elements removed. For example, FIG. 7C displays core URI string 706 after 3 rounds of testing/processing of URI 702. As shown, the "page" element 750 was determined to effect display of the signature elements, and thus was re-added to the augmented URI string to produce the core string. In certain embodiments, URI elements can be identified as core elements. For example, certain elements can be associated with filtering which signature elements are displayed (e.g., to display some but not all of the signature elements). URI normalization processing can determine such core elements for use in an information extraction process. For example, "page" element 750 may be considered a core element.

With reference to FIGS. 7D-E, the URL normalization process continues to remove additional parameters, testing elements displayed in associated content pages until a "canonical URL" is determined. For example, the content page associated with FIG. 7C is the same as or similar to the content page associated with FIG. 7D. Thus, the system determines that the URL of FIG. 7C is not considered a canonical URL, since modifications to the URL do not result in any page element modifications. In certain embodiments, mere sorting or arranging of page elements such as item listings do not represent a page "change" required for a determination of a canonical URL, since modification of the last removed parameter does not result in any new or different page elements.

The URL normalization process continues element-by-element until the content page associated with FIG. 7E is retrieved. The last parameter in the URL string of FIG. 7E may be determined to control the page elements displayed in the associated content page. For example, removal or modification of the "type=category" parameter may result in modification of displayed listing items in the retrieved content page. The system may determine that the URL of FIG. 7E is therefore associated with a canonical URL for the domain. In certain embodiments, the domain may have numerous canonical URL's associated with controlling various page elements or item listings.

Rules can be determined once one or more core URI's or elements have been identified. For example, "page" element 750 may be found to control signature element listings with respect to many resources found in domain 710. Each resource may receive a "page" element to specify a particular page of any multi-page result-set, such as a result set that includes 100 product listings where only 10 listings are shown per page. In certain embodiments, rules can be established with respect to a particular domain, or globally across many domains. For example, the page element can be tested and verified across other domains. Thus, the "page" element may become a global processing rule for immediate identification of core elements in future seed URI's provided to URI normalization process 300.

In certain embodiments, a parameter category identifier may be useless on certain types of pages associated with a particular domain or website. For example, this may be the case for product or item pages where supplying a "productID" parameter is enough to render the page. This parameter may also be useful on other types of pages, such as a category listing page. The URL normalization process determines these useful parameters and outputs a rule. In certain embodiments, the URL normalization process, including iterative parameter removal, is run on pages with a certain recognized cluster of URL elements, such as URL prefix elements or URL path elements. When a particular parameter is found to be useless, a rule is created for URL's that match the identified cluster pattern. For example, the rule may state that "for URLs that are similar to this URL prefix/path, this "categoryID" parameter is useless." In certain embodiments, the URL normalization process determines when a parameter is useless when combined with a particular URL prefix, path, domain, or other parameters. For example, a regular expression-based rule may be determined and applied to URL's.

In certain embodiments, a product listing is recognized on an e-commerce website. The product listing is processed to identify additional product listings and each identified product listing page is "crawled" to find other product listings. The product listings for the website can then be modeled. The process is repeated on additional Ecommerce websites to create a data structure or model that can be searched and can help identify related products. In certain embodiments, the model can be used to help catalog additional product listings. Products can be classified and compared using, for example, title or image recognition.

In certain embodiments, information regarding identified product listings is extracted using an algorithm. The algorithm involves extracting the HTML DOM of an Ecommerce webpage, and traversing it to find patterns indicative of relevant content such as product listings. CSS stylesheets can be downloaded and applied to the HTML elements and Javascript can be disabled in order to simplify crawling and product identification. Image links are downloaded and analyzed for relevancy using, for example, image recognition techniques and comparison processes.

In certain embodiments, a "pivot" item that likely represents a product listing is identified within the extracted DOM. A pivot item may correspond to a candidate node. Generally, a product will be represented by at least an image having particular attributes. Accordingly, such image elements are located and selected as pivots. The algorithm uses additional clues embedded in the DOM structure or linked content, such as style sheet classes or GUI elements, in order to help identify such pivot items. Lists of parent and child elements are determined. For example, parent elements are located by traversing the DOM up from a pivot element until a single element with multiple nested pivot items is located. Often, this will require traversing the DOM up several elements since the pivot may be nested within several HTML elements, such as "divs" (e.g., denoted by a "<DIV>" tag) or other elements, that contain positioning information and text describing the product or other product listing information. For example, a parent element may include several rows of pivot items nested within it, such as in a traditional product search page. Child elements are the highest order elements within the parent element that include only one pivot element.

In certain embodiments, URI's are clustered into groups based on similarities between them, or "similarity criteria." The similarity criteria can be based on a link analysis of the website and the determined type of page (e.g., item page, listing page, etc.). URI parameters are iterated through to determined "useless" parameters and corresponding regular expressions for identifying base URI's to apply the determined rules to. The base URI's may include domain, prefix, subdomain, path, or parameter elements of the URI. In certain embodiments, removal of "useless" parameters result in no modification to the retrieved page.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044, 506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 8:
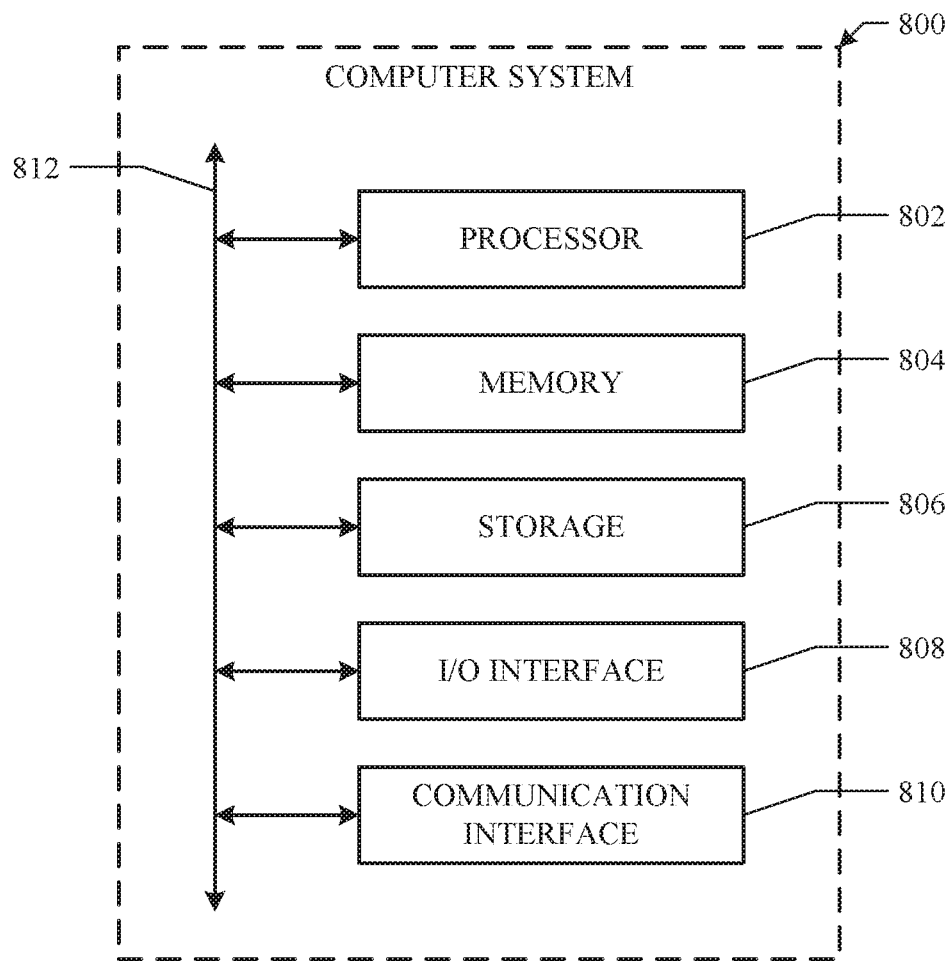
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by one or more processors, receiving a plurality of uniform resource identifiers (URI's) associated with a particular domain, wherein each of the URI's identifies a content page comprising one or more signature elements; and
by the one or more processors, for each URI in the plurality of URI's:
successively retrieving content pages for modified versions of the URI to identify a core of the URI and any unnecessary elements of the URI, wherein the core of the URI corresponds to a modified version with the fewest number of URI elements that is sufficient to retrieve a version of the content page including all of its signature elements; and
updating a set of rules based on the identified core and the identified unnecessary elements, wherein the set of rules establishes a normalized version of the URI.

2. The method of claim 1, wherein at least one of the unnecessary elements of the URI is a parameter of the URI.

3. The method of claim 1, wherein at least one of the unnecessary elements of the URI is a section of a path of the URI.

4. The method of claim 1, wherein successively testing the URI comprises:
determining a last element of the URI;

removing the last element from the URI to define an augmented URI; and retrieving the identified content page for the augmented URI.

5. The method of claim 1, wherein successively testing the URI comprises:

for each element of the URI and until the core of the URI is identified:

determining a last element of the URI;

removing the last element of the URI to define an augmented URI;

retrieving the identified content page for the augmented URI; and determining whether the retrieved content page includes all of the signature elements.

6. The method of claim 5, further comprising identifying the core of the URI as the augmented URI and the last element of the URI in response to determining that the retrieved content page does not include all of the signature elements.

7. The method of claim 5, wherein successively testing the URI further comprises:

in response to determining that the identified content page for the augmented URI does not include all of the signature elements, determining that the last element of the URI is a key element of the core URI, the key element being necessary to retrieve the version of the content page including all of its signature elements.

8. The method of claim 1, wherein the URI comprises a path and a query string, the query string comprising one or more field-value pairs.

9. The method of claim 8, wherein successively testing the URI comprises successively removing field-value pairs from an end of the URI.

10. The method of claim 1, wherein the signature elements of the content page comprise one or more product listings.

11. The method of claim 1, wherein each normalized version of the URI is configured to retrieve a set of product listings.

12. One or more computer-readable non-transitory storage media embodying software that is operable when executed to:

receive a plurality of uniform resource identifiers (URI's) associated with a particular domain, wherein each of the URI's identifies a content page comprising one or more signature elements; and for each URI in the plurality of URI's:

successively retrieving content pages for modified versions of the URI to identify a core of the URI and any unnecessary elements of the URI, wherein the core of the URI corresponds to a modified version with the fewest number of URI elements that is sufficient to retrieve a version of the content page including all of its signature elements; and update a set of rules based on the identified core and the identified unnecessary elements, wherein the set of rules establishes a normalized version of the URI.

13. The computer-readable non-transitory storage media of claim 12, wherein at least one of the unnecessary elements of the URI is a parameter of the URI.

14. The computer-readable non-transitory storage media of claim 12, wherein at least one of the unnecessary elements of the URI is a section of a path of the URI.

15. The computer-readable non-transitory storage media of claim 12, wherein successively testing the URI comprises:

determining a last element of the URI;

removing the last element from the URI to define an augmented URI; and retrieving the identified content page for the augmented URI.

16. The computer-readable non-transitory storage media of claim 12, wherein successively testing the URI comprises:

for each element of the URI and until the core of the URI is identified:

determining a last element of the URI;

removing the last element of the URI to define an augmented URI;

retrieving the identified content page for the augmented URI; and determining whether the retrieved content page includes all of the signature elements.

17. The computer-readable non-transitory storage media of claim 16, wherein the software is further operable when executed to identify the core of the URI as the augmented URI and the last element of the URI in response to determining that the retrieved content page does not include all of the signature elements.

18. The computer-readable non-transitory storage media of claim 16, wherein successively testing the URI further comprises:

in response to determining that the identified content page for the augmented URI does not include all of the signature elements, determining that the last element of the URI is a key element of the core URI, the key element being necessary to retrieve the version of the content page including all of its signature elements.

19. The computer-readable non-transitory storage media of claim 12, wherein the URI comprises a path and a query string, the query string comprising one or more field-value pairs.

20. A system comprising: one or more processors; and a non-transitory memory coupled to the processors comprising instructions executable by the processors, the processors operable when executing the instructions to:

receive a plurality of uniform resource identifiers (URI's) associated with a particular domain, wherein each of the URI's identifies a content page comprising one or more signature elements; and for each URI in the plurality of URI's:

successively retrieving content pages for modified versions of the URI to identify a core of the URI and any unnecessary elements of the URI, wherein the core of the URI corresponds to a modified version with the fewest number of URI elements that is sufficient to retrieve a version of the content page including all of its signature elements; and update a set of rules based on the identified core and the identified unnecessary elements, wherein the set of rules establishes a normalized version of the URI.

* * * * *